United States Patent

Hoshishima et al.

[11] Patent Number: 5,518,035
[45] Date of Patent: May 21, 1996

[54] END STRUCTURE OF A HOSE

[75] Inventors: Hiroyuki Hoshishima, Okayama; Yasumichi Ogawa, Kurashiki, both of Japan

[73] Assignee: Marugo Rubber Industries, Ltd., Kurashiki, Japan

[21] Appl. No.: 427,183

[22] Filed: Apr. 21, 1995

[30] Foreign Application Priority Data

Apr. 28, 1994 [JP] Japan .................................. 6-114395

[51] Int. Cl.$^6$ .................................................... F16L 11/04
[52] U.S. Cl. ......................... 138/109; 138/137; 138/140; 138/141
[58] Field of Search ............................ 138/109, 124–127, 138/137, 141, 145, 146, DIG. 3, 140

[56] References Cited

U.S. PATENT DOCUMENTS

| | | | |
|---|---|---|---|
| 2,917,102 | 12/1959 | Mahady | 138/126 X |
| 4,330,017 | 5/1982 | Satoh et al. | 138/126 |
| 4,905,735 | 3/1990 | Akiyoshi | 138/137 X |
| 4,905,736 | 3/1990 | Kitami et al. | 138/109 X |
| 4,907,625 | 3/1990 | Ito et al. | 138/126 |
| 4,942,906 | 7/1990 | Igarashi et al. | 138/137 X |
| 4,984,604 | 1/1991 | Nishimura | 138/126 |
| 5,016,675 | 5/1991 | Igarashi et al. | 138/137 X |
| 5,093,166 | 3/1992 | Nishimura | 138/137 X |
| 5,284,184 | 2/1994 | Noone et al. | 138/125 X |

FOREIGN PATENT DOCUMENTS 5-44874  2/1993  Japan .

*Primary Examiner*—David Scherbel
*Assistant Examiner*—Patrick F. Brinson
*Attorney, Agent, or Firm*—Keck, Mahin & Cate

[57] ABSTRACT

There is provided a hose end structure comprising an inner layer of a low gas permeability material having a radially outwardly extended end portion, and a rubber layer on an inner surface of the radially outwardly extended end portion.

3 Claims, 2 Drawing Sheets ial such as a fuel out of the hose, attempts have been made to coat a sealing material or an adhesive material to the connecting position of the elements and to provide another rubber layer on an inner surface of the low permeable resin layer. The provision of a sealing material or an adhesive material to the connecting portion results in incapability of releasing the hose from the mating parts, and the additional rubber layer on the inner surface of the resin layer results in less economical because the rubber layer is disposed on the entire inner surface though it can limit the evaporation of the volatile material out of the hose.

END STRUCTURE OF A HOSE

BACKGROUND OF THE INVENTION

The present invention relates to a hose which is suitable for use in positions which require low gas permeability such as a fuel passage for vehicles and, more particularly, to an end structure of the hose.

In forming of a fuel passage for vehicles and other passages for volatile material, rubber has been used in many cases for a substantial material for such passages in view of formability, buffing action and economic aspects. Recently, however, there is a strong tendency that evaporation of the volatile material to the atmosphere must be strictly restricted while the volatile material flows through the hose. An attempt has been made to insert a layer of a low gas permeability material such as fluorine-contained resin (fluororesin) into a rubber layer as, for example, shown in Japanese Patent Publication (Unexamined) No. 5-44874, published Feb. 23, 1993. This attempt is the most effective if the fluororesin layer as the low gas permeability material is disposed on an inner layer of the hose since the volatile material is leaked or evaporated from the hose not only in the radial direction of the hose but also from an end portion of the hose during running longitudinally through the wall of hose. On the other hand, however, the hose having such a hard inner resin layer of a low-permeability material as described above reduces a contacting effect or sealing effect relative to mating parts when the hose is connected to the mating parts and there are cases that the volatile material diffuses from the connecting ends of the hose.

In order to prevent the leakage or evaporation of the volatile material such as a fuel out of the hose, attempts have been made to coat a sealing material or an adhesive material to the connecting position of the elements and to provide another rubber layer on an inner surface of the low permeable resin layer. The provision of a sealing material or an adhesive material to the connecting portion results in incapability of releasing the hose from the mating parts, and the additional rubber layer on the inner surface of the resin layer results in less economical because the rubber layer is disposed on the entire inner surface though it can limit the evaporation of the volatile material out of the hose.

SUMMARY OF THE INVENTION

An object of the present invention is to provide an improvement in the hose end structure which can provide a high sealing effect at the connecting portion between the hose and the mating parts and which permits an easy release of the hose from the mating parts in spite of using low gas permeability material as an inner layer of hard resin.

Another object of the present invention is to provide a new hose end structure which can be manufactured economically.

According to the present invention, there is provided a hose end structure comprising an inner layer of a low gas permeability material having a radially outwardly extended end portion, and a rubber layer on an inner surface of the radially outwardly extended end portion.

According to the present invention, the hose is provided with an inner layer of a low gas permeability material on the entire inner surface of the hose and, accordingly, evaporation of the volatile material which passes through the hose can be effectively restricted. Further, since the inner surface of the radially outwardly extended end portion of the hose is exclusively provided with a rubber layer, a desirable sealing effect can be obtained at the connecting portions between the hose end and the other elements such as the mating parts. In addition to the above, since the rubber layer is disposed and adhered on the inner circumferential surface of the low gas permeable material layer, evaporation or leakage of the volatile material between the innermost rubber layer and the low gas permeable resin layer can effectively be restricted. This structure of the hose can provide a cost reduction effect.

BRIEF DESCRIPTION OF THE DRAWINGS

FIGS. 2A and 2B are details of core material 30 taken at the points indicated on FIG. 2.

PREFERRED EMBODIMENT OF THE INVENTION

Figure 1:
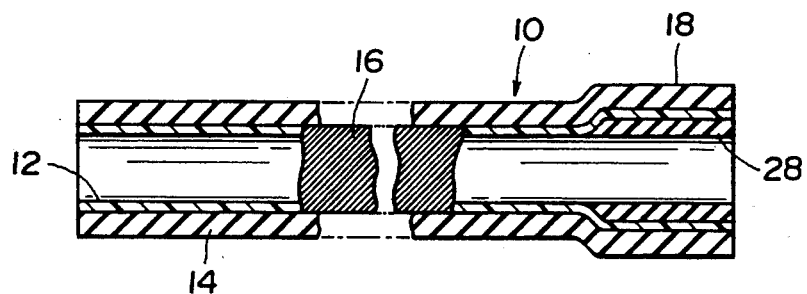
FIG. 1 is a sectional view of a hose according to the present invention.

A preferred embodiment of the invention will be described with reference to the accompanying drawings. In FIG. 1, a hose 10 of a preferred embodiment of the present invention has an inner layer 12 of a low gas permeable material such as a fluorine-contained resin (for example, polytetrafluoroethylene, copolymer of polytetrafluoroethylene-hexafluoropropylene) or polyamide resin, and an outer layer 14 of weatherable rubber such as epichlorohydrin rubber. If necessary, the outer layer 14 can be omitted. In FIG. 1, reference numeral 16 represents an outer surface of the inner layer 12.

Figure 2:
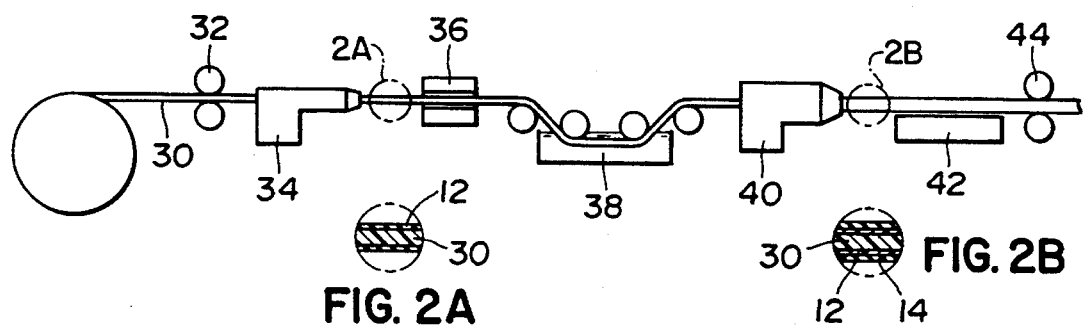
FIG. 2 is a diagram showing a production process of the hose of the present invention.

Referring to FIG. 2 which is a diagram showing a manufacturing process of the hose 10 of the present invention, a core material, that is, a resin mandrel 30 and the like which has been wound is fed by a supply roller device 32 and a low gas permeable material is then extruded on to an outer surface of the core material 30 by a resin extruder 34 to form an inner layer 12, as shown in FIG. 2A. The core material 30 which is a reinforcing resin at the time of treatment of the inner layer 12 is pulled out at the last step of the procedure.

The inner layer 12 is then subject to a surface treatment such as corona discharge treatment, laser treatment, flame treatment, etc. to provide the outer layer 14 with desired adhesion properties by means of a surface treatment device 36. The inner layer 12 is then fed through an adhesive agent application device 38 and a rubber extruder 40 so that the weatherable rubber is coated on the surface of the inner layer 12 to provide the aforementioned outer layer 14, as shown in FIG 2B, and then fed to a cooling device 42 for cooling. Then the outer and inner layers are taken-up by a feeding roller device 44 and then cut to a predetermined length. In the last step, the core material 30 is taken out to form a passage.

Figure 3:
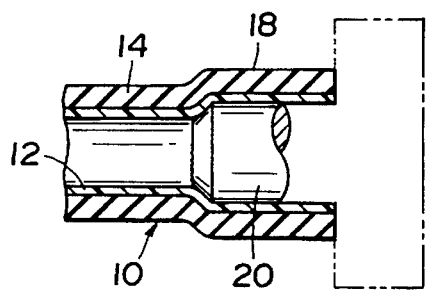
FIG. 3 is a sectional view of an end of the hose, showing a production method of the end portion of the hose.

In the hose manufactured as described above, it is necessary to vulcanize the rubber which forms the outer layer 14 in such a manner that, as shown in FIG. 3, a plug-like jig 20, which has a larger diameter than an inner diameter of an end 18 of the hose 10, is forcibly inserted into an end 18 and vulcanized, with the result that the end 18 is radially outwardly extended to provide a larger diameter as illustrated in FIG. 3.

Figure 4:
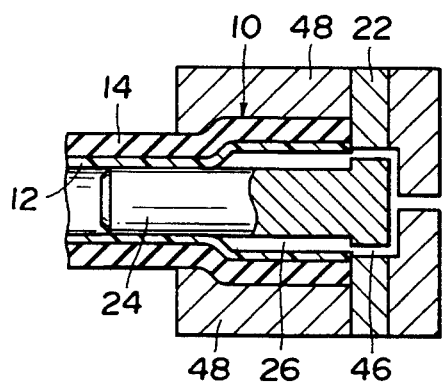
FIG. 4 is a sectional view of the hose and production mold showing the method of the end portion of the hose.

Then, as shown in FIG. 4, an inner mold 22 is inserted into the extended end 18. The inner mold 22 has a tubular portion 24 which is projected through the extended portion into an inner circumference of the inner layer 12, and rubber injection runner 46 which is connected to an annular space 26 which is formed between the tubular portion 24 and the extended inner layer 12. It is preferred that a surface treatment and application of an adhesive agent are made to an inner circumference of the extended end portion 18 to thereby improve the adhesion before the insertion of the inner mold 22. An outer mold 48 formed of a split mold is fitted around the outer circumference of the extended end 18 of the outer layer 14. The outer mold 48 is used for the purpose of limiting an expansion of the outer layer 14 at the time of injection of the rubber material. After the outer mold 48 is fitted, rubber material is injected from a rubber injection runner 46 so that a rubber layer 28 (FIG. 1) is adhered to an inner circumferential surface of the inner layer 12.

The rubber layer 28 is also selected from, alone or in combination, FKM (fluororubber), NBR (acrylonitrile-butadiene rubber), NBR/PVC(acrylonitrile-butadiene rubber/polyvinyl chloride), H-NBR (hydrogen-added acrylonitrile-butadiene rubber) which have low gas permeable characteristics.

Figure 5:
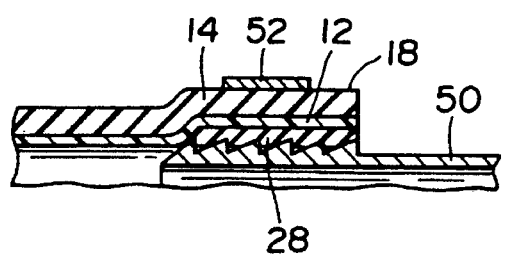
FIGS. 5 and 6 are sectional views of a part of the hose showing the connecting portion with the mating part.
Figure 6:
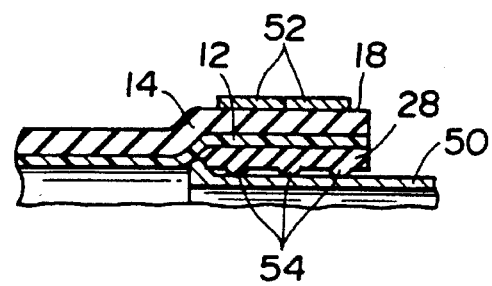

In FIGS. 5 and 6 which show connection between the hose 10 and the mating part 50 wherein reference numeral 52 represents a fastening belt for the outer circumference of the hose 10, the rubber layer 28 formed on an inner circumference of the inner layer 12 of the radially outwardly extended end portion 18 of the hose 10 is elastically deformed relative to, and corresponding to the shape of, the mating part 50 as shown in FIG. 5 and, accordingly, a desired sealing effect can be obtained. In order to further improve the sealing effect, sealing lips 54 can be formed on the inner circumferential surface of the rubber layer 28 as shown in FIG. 6 by providing grooves around the outer circumference of the tubular portion 24 of the inner mold 22.

Figure 7:
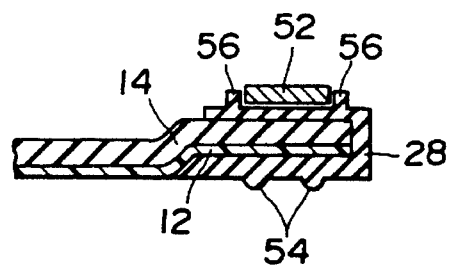
FIGS. 7 and 8 show modified structures of the end portion of the hose.
Figure 8:
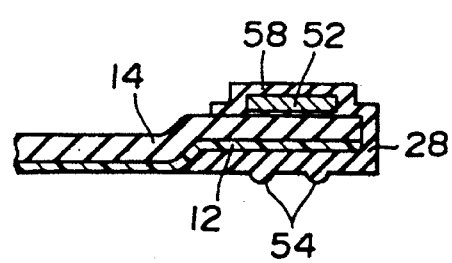

In FIGS. 7 and 8 which show other embodiments of the invention, the rubber layer 28 having sealing lips 54 is extended to the outer circumference of the outer layer 14 and band-positioning members 56 are provided above the position of the sealing lips 54 (FIG. 7) to secure a fastening band 52, and the rubber layer 28 is extended outside the band 52 to provide a band-holding structure 58 as shown in FIG. 8. These structure provides a further improvement in a sealing effect.

The hose 10 can be formed of a single-layer structure of polyamide resin which is of low gas permeability and weatherable. In this case no vulcanization is needed but a heating operation will be necessary for expanding the diameter of the end portion so that the end portion is extended radially outwardly as described above.

Figure 9:
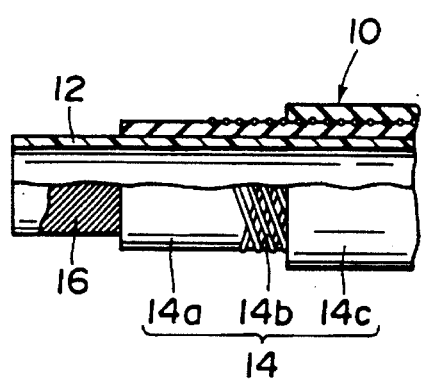
FIGS. 9 and 10 show further modified structures of the outer layer of the hose.
Figure 10:
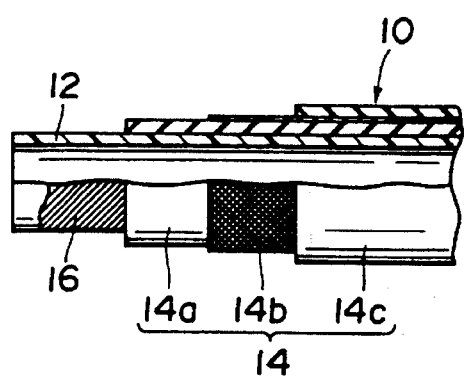

FIGS. 9 and 10 show modifications in which the outer layer 14 has a three-layer construction having a first rubber layer 14a, a reinforcing middle layer 14b of strings or yarns 14b wound around the first rubber layer 14a and a second rubber layer 14c on the middle layer of the reinforcing strings. The reinforcing strings of the middle layer 14b in the embodiment of FIG. 9 is wound in a relatively coarse manner and the reinforcing strings of the middle layer 14b of FIG. 10 is wound in a relatively dense manner.

According to the present invention, a substantially entire inner surface of the hose is made of a low gas permeable resin layer and, therefore, the volatile material which passes through the hose can be effectively prevented from being evaporated and diffused out of the hose. Further, the end of the hose is formed with a rubber layer at its innermost surface and, therefore, a desired sealing property of the connecting end portions can be established. Further, since the innermost rubber layer of the hose end is made of rubber of a low gas permeability, it can prevent the volatile material from evaporating from the end portion of the rubber layer. Further, a most part of the hose except the short length of the end portions has a two-layer construction and, therefore, cost reduction can be achieved by reducing and limiting the length of the innermost rubber layer. In addition, the hose, if necessary, can be fitted to or released from the mating parts without damage to the end portions.

Although the hose of the preferred embodiment described above has an outer layer 14 on an outer surface of the inner layer 12, the outer layer 14 can be omitted if necessary.

What we claim is:

1. A hose end structure comprising an inner layer of a low gas permeability material having a radially outwardly extending end portion, and a rubber layer on an inner surface of the radially outwardly extending end portion, wherein the inner layer is made of fluorine-containing resin.

2. The hose end structure according the claim 1, wherein said rubber layer is made of a gas permeable material selected from, alone or in combination, FKM (fluororubber), NBR (acrylonitrile-butadiene rubber), NBR/PVC(acrylonitrile-butadiene rubber/polyvinyl chloride), and H-NBR (hydrogen-added acrylonitrile-butadiene rubber).

3. The hose end structure according to claim 1, wherein an outer layer of a weatherable rubber is disposed on an outer surface of said inner layer.

\* \* \* \* \*